United States Patent [19]

Buck et al.

[11] 4,295,363
[45] Oct. 20, 1981

[54] APPARATUS FOR DIAGNOSING FAULTS IN INDIVIDUAL CYLINDERS IN AN INTERNAL COMBUSTION ENGINE

[75] Inventors: Gordon K. Buck, Greenlawn; Cynthia H. Kozin, Huntington, both of N.Y.

[73] Assignee: Harris Corporation, Cleveland, Ohio

[21] Appl. No.: 781,313

[22] Filed: Mar. 25, 1977

[51] Int. Cl.$^3$ .......................................... G01M 15/00
[52] U.S. Cl. ................................ 73/117.3; 364/551
[58] Field of Search ............... 73/117.2, 117.3, 133 R, 73/116, 119 A; 324/162, 178, 179; 364/551

[56] References Cited
U.S. PATENT DOCUMENTS

| | | | |
|---|---|---|---|
| 3,657,922 | 4/1972 | Sibeud | 73/117.3 |
| 3,677,075 | 7/1972 | Scott | 73/117.3 |
| 3,815,411 | 6/1974 | Emerson | 73/117.3 |
| 3,952,586 | 4/1976 | Hanson et al. | 73/116 X |
| 4,016,753 | 4/1977 | Willenbecher et al. | 73/116 |

*Primary Examiner*—Jerry W. Myracle
*Attorney, Agent, or Firm*—Yount & Tarolli

[57] ABSTRACT

Malfunctions, such as low power performance or low compression, of individual cylinders of an internal combustion engine are determined by the apparatus herein. Measurements are made as to the values of the time intervals between successive crankshaft positions as the crankshaft of an engine rotates through at least one engine cycle. One engine cycle is defined as the number of power periods corresponding with the number of cylinders of the engine being tested. Each power period includes a plurality of crankshaft positions. At least two time interval measurements for each power period are examined to determine the difference in value. This is an index or indication of the condition of the cylinder associated with that power period. A ratio of each index to the average index for at least two cylinders is obtained. The index ratio for each cylinder is then compared with a threshold and an output may be given as to a faulty condition, such as low compression or low power, at a particular cylinder.

19 Claims, 11 Drawing Figures

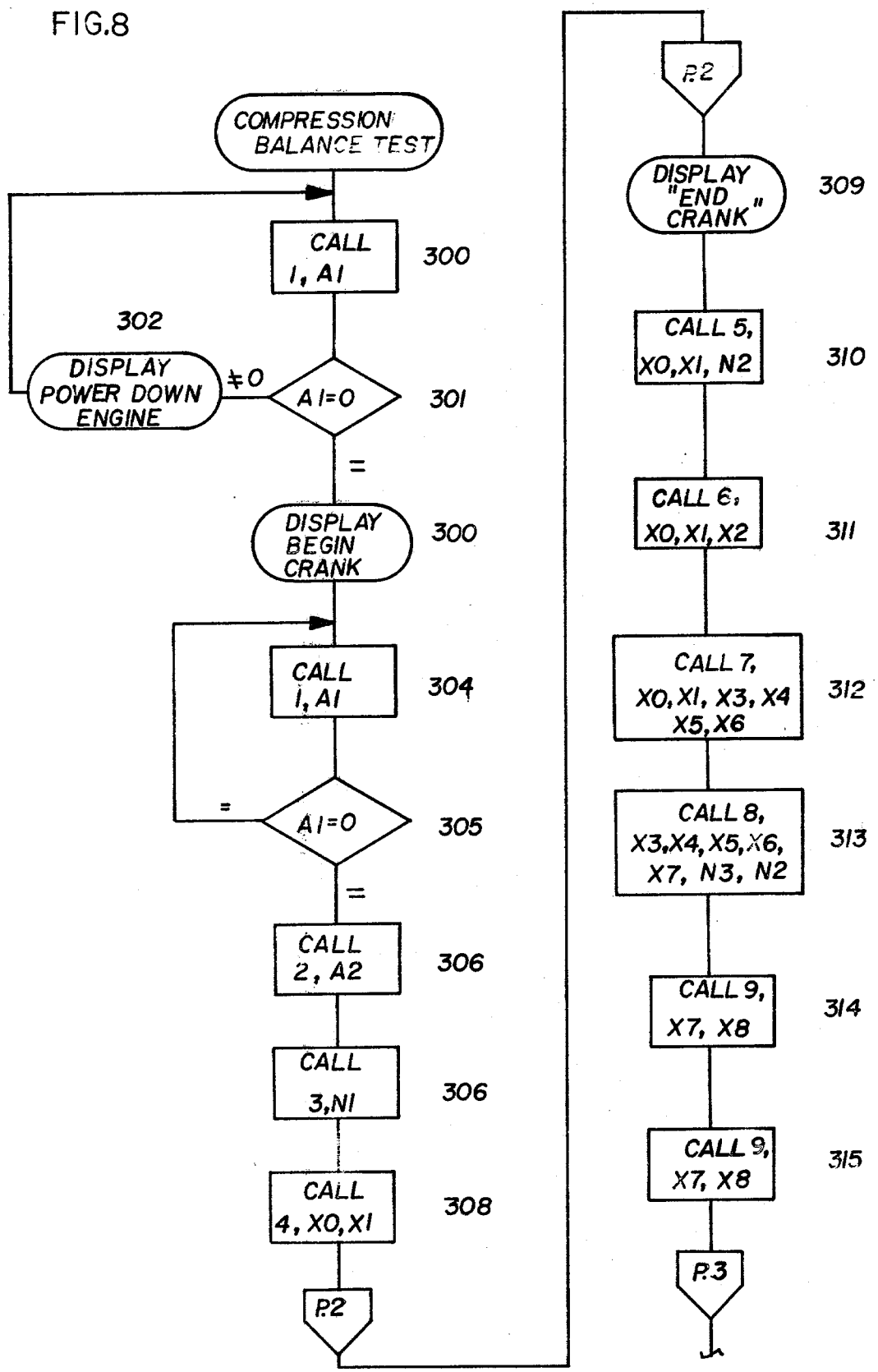

APPARATUS FOR DIAGNOSING FAULTS IN INDIVIDUAL CYLINDERS IN AN INTERNAL COMBUSTION ENGINE

BACKGROUND AND FIELD OF THE INVENTION

The invention relates to the art of diagnosing engines and, more particularly, to diagnosing internal combustion engines while the crankshaft is rotating.

Whereas the invention is described herein in conjunction with compression ignition engines, the invention is not limited thereto as it may be used for testing other types of engines, such as spark ignition engines.

Engine analyzers are known in the prior art. Examples of prior art patents on this subject include the United States patents to Hanson U.S. Pat. No. 3,994,160, Hanson et al. No. 3,942,365, Hanson et al. No. 3,972,230, and Emerson No. 3,815,411. In general, each of these patents is directed toward a system for analyzing an engine operating with fuel being supplied so as to obtain an indication of power performance. In addition, these patents generally teach systems wherein an indication of engine speed and the contribution made by each cylinder is determined by examining the value of the time interval of each power period. The reciprocal of this value provides an indication of the average speed during the power period. By noting the various different levels of average speeds for various power periods, an indication of a low power performance is obtained.

The present invention is directed to improvements over that suggested by such prior art. In accordance with the present invention, the values of the time intervals between successive crankshaft positions are measured so as to obtain a plurality of time interval samples for each power period so as to obtain an accurate indication of the variations of engine speed throughout each power period. Also, in accordance with the present invention, at least two of these interval samples from each power period are employed for determining engine performance, such as compression and power performance levels.

SUMMARY OF THE INVENTION

It is therefore an object of the present invention to provide improvements in diagnosing an internal combustion engine to determine the existance of malfunctions in the individual cylinders thereof.

It is a more specific object of the present invention to provide improvements in diagnosing an internal combustion engine to determine compression faults of individual cylinders while the engine's crankshaft is being driven by a crank motor.

It is a still further object of the present invention to provide improvements in diagnosing an internal combustion engine to determine power faults of individual cylinders while the engine is operating with fuel being supplied and the crankshaft is rapidly accelerated from a low engine speed to a high engine speed.

In accordance with the present invention, the time intervals between successive crankshaft positions are measured as the crankshaft rotates through at least one engine cycle wherein one engine cycle includes a number of power periods corresponding with the number of cylinders of the engine being tested and wherein each power period includes a plurality of crankshaft positions. For each power period, the values of a pair of time intervals associated with a selected pair of crankshaft positions in the associated power period are compared and a first indication is given in accordance therewith. The first indications are compared with each other for providing a second indication used in determining whether a malfunction condition exists.

In accordance with a more limited aspect of the present invention, each second indication is a ratio of the first indication to the average of at least two of the first indications.

In accordance with a still further aspect of the present invention, a determination is made as to whether any of the ratios deviate from a reference ratio.

In accordance with a still further aspect of the present invention, a programmed computer is employed for computing the first indication by determining the difference in values of the time intervals of each pair and then calculating the values of the ratios of each first indication to the average value of at least two of the first indications.

In accordance with a still further aspect of the present invention, the computer is programmed to determine from the time interval samples as to whether a low compression fault exists in one of the individual cylinders based on time interval samples taken while the engine's crankshaft was being driven by a crank motor.

In accordance with a still further aspect of the present invention, the computer is programmed to determine whether a low power condition exists in one of the cylinders based on time interval samples taken while the engine was operating with fuel supplied and the crankshaft was being rapidly accelerated from a low engine speed to a high engine speed.

BRIEF DESCRIPTION OF THE DRAWINGS

The foregoing and other objects and advantages of the invention will now be described in conjunction with a preferred embodiment as taken in conjunction with the accompanying drawings which are a part hereof and wherein:

FIGS. 8 and 8A are flow charts of the program used in the computer of the system in FIG. 1 to control the test procedure and compute the test results of a compression test; and, FIGS. 9 and 9A are flow charts of a program used in the computer in the system of FIG. 1 to control the test procedure and compute the test results of a power performance test.

DETAILED DESCRIPTION

Figure 1:
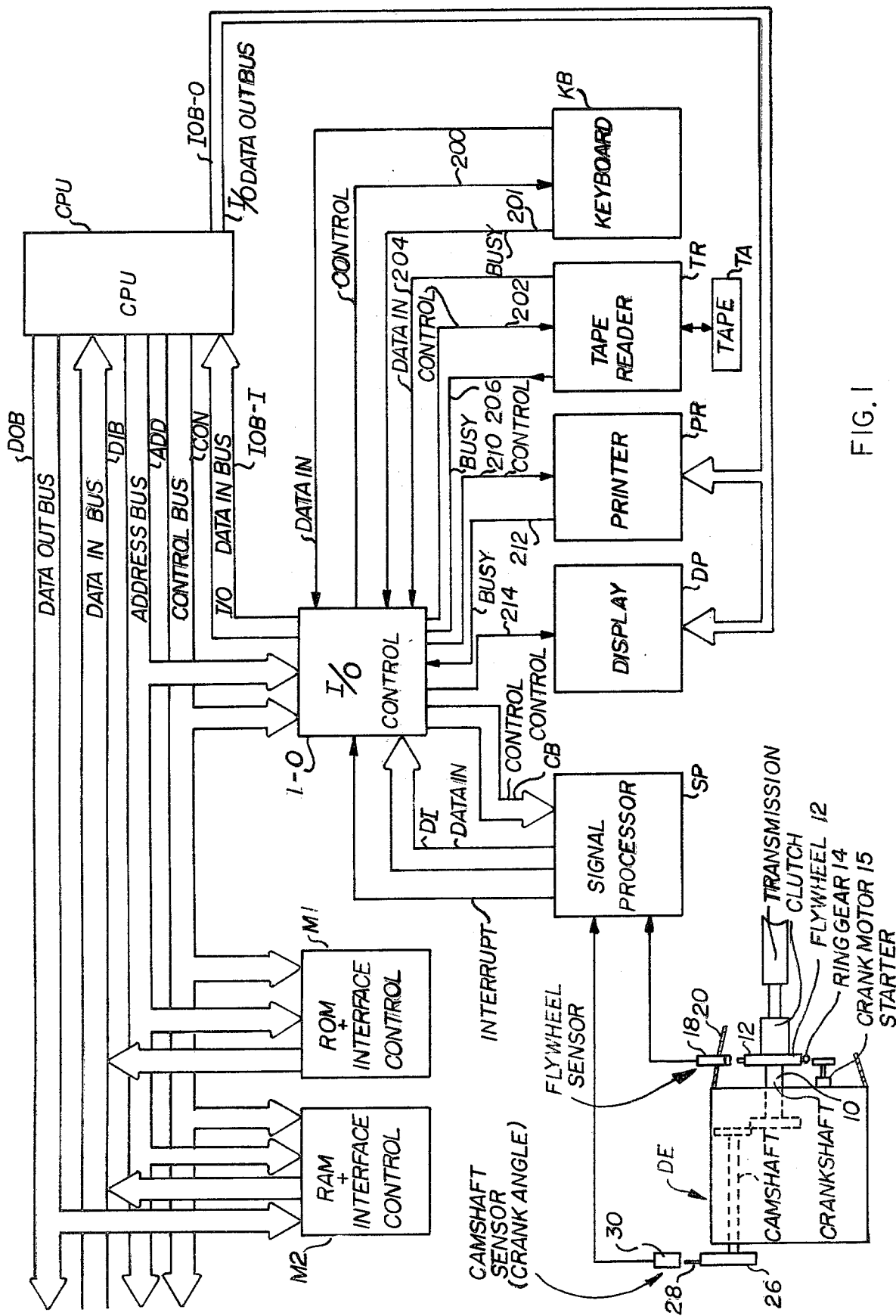
FIG. 1 is a schematic-block diagram illustration of the apparatus employed in accordance with the invention.

Referring now to the drawings, wherein the showings are for purposes of illustrating a preferred embodiment of the invention only and not for purposes of limiting same, FIG. 1 illustrates the analyzer in conjunction with testing a Diesel engine DE. In the example given herein, the engine is a fuel injected engine having six cylinders in line. The firing order of the cylinders is 1-5-3-6-2-4. This is a four cycle engine which means that the crankshaft requires two revolutions for all cylinders to fire. As is conventional, the crankshaft 10 carries a flywheel 12 having a ring gear 14 carried on its outer periphery. This ring gear is provided with 118 evenly spaced teeth extending radially outward in an annular array. As is well-known, the ring gear teeth are employed during the starting process when engaged by a crank motor 15 so as to drive the crankshaft.

The analyzer employs a sensor for sensing the passage of each ring gear tooth at a particular point. This is accomplished by mounting a suitable reluctance or magnetic type sensor on the flywheel housing 20 so that the sensor extends through housing 20 so as to be positioned to produce one pulse for each tooth of the ring gear. These pulses are supplied to a signal processor SP to be described in greater detail below. Thus, for each revolution of the crankshaft 10, the sensor 18 will provide a total of 118 pulses to the signal processor. Since one engine cycle requires two revolutions of the crankshaft, 236 pulses will be supplied to the processor for each engine cycle. Since the engine being described is a six cylinder engine, each engine cycle will include the six power periods with each power period including a compression stroke and an acceleration stroke.

It is desirable to obtain information to relate the ring gear pulses to crankshaft positions. This is accomplished by producing one pulse, referred to herein as a crank marker pulse, for each engine cycle so that the crank marker pulse is associated with a crankshaft position in the engine cycle. Preferably, the crank marker pulse is produced so as to be essentially coincident with one of the ring gear pulses. Since the engine being described produces two crankshaft revolutions for each engine cycle, a single pulse for each engine cycle may be obtained from a camshaft 24 which is geared to the crankshaft internally of the engine such that the camshaft makes but one revolution per engine cycle. Consequently, a disc 26 may be mounted to the exposed end of the camshaft with the disc carrying a suitable marker such as a bolt 28 or the like. The location of bolt 28 has a known crankshaft position relationship to a particular tooth on the ring gear 14. A suitable reluctance type sensor 30 serves as the camshaft sensor to produce one crank marker pulse for each engine cycle and this pulse is supplied to the signal processor SP.

The signal processor SP receives the pulses obtained from the camshaft sensor 30 and under computer control forwards data, in the form of samples, for storage in a memory. The samples forwarded by the signal processor take the form of multi-bit digital words. For one engine cycle of engine DE, there will be 236 samples. Each sample represents the time interval between successive pulses provided by the flywheel sensor 18. These samples are supplied to a general purpose computer which is programmed to use the samples and to make a fault diagnosis. When the diagnosis has been completed, a suitable display representative of the diagnosis is presented by a visual display DP and a print-out may be provided by a printer PR. It is contemplated that the analyzer may be employed for testing various engine types and information may be supplied to the computer as to the engine type as by means of a suitable multidigit thumbwheel selector or keyboard KB. It is further contemplated that the computer may be provided with different test programs for the various engine types and these may be stored on a suitable cassette tape TA and read by a tape reader TR for loading into the computer's memory. The engine analyzer preferably employs a programmed general purpose computer including a central processing unit CPU and external memory including a read-only memory M-1 including suitable interface control and an external random access memory M-2, together with suitable interface control. In the embodiment illustrated, the CPU may be a microprocessor provided by National Semiconductor Corporation and known as Model IMP-16. This particular microprocessor is a 16-bit machine and employs a control read-only memory having micro instructions therein for internal control of the CPU, together with several arithmetic logic units and two 4K by 16-bit random access memories. This is a P-MOS circuit. This particular microprocessor is by way of example only, as microprocessors provided by other manufacturers may be used for accomplishing the functions to be described herein. The bus structure may take the form of that illustrated in FIG. 1 and which includes an address bus ADD for addressing the input/output control IO, the read-only memory M-1, or the random access memory M-2. A control bus CON extends from the CPU for providing control signals to the input/output control IO, the read-only memory M-1, and the random access memory M-2. The control bus conventionally carries such signals as READ, and WRITE. For example, when the CPU addresses memory M-1, a READ signal on the control bus COM, when directed to the read-only memory M-1, will cause data at a particular address in the memory to be read out and placed on the DATA IN BUS DIB for transport to the CPU. The data obtained from the peripherals may be supplied to the CPU by a I/O DATA IN BUS IOB-I. The CPU may store data and instructions in memory M-2 through DATA OUT BUS DOB. Also, data may be outputted from the CPU to some peripherals by an I/O DATA OUT BUS IOB-O.

As is conventional, the internal control of the CPU is controlled by the micro instructions contained in the internal read-only memory within the CPU. These instructions are modified from an external read-only memory M-1 which may be considered as being programmed with macro instructions. Additional macro instructions may be written into the random access memory M-2. These will determine the manner in which the system operates to perform the diagnostic analysis to be described in greater detail hereinafter.

Having now generally described the system as set forth in FIG. 1, attention will now be directed to a detailed description of the present embodiment. The description which follows will present a detailed description of a signal processor SP and the manner in which the computer operates upon the samples.

SIGNAL PROCESSOR

Figure 2:
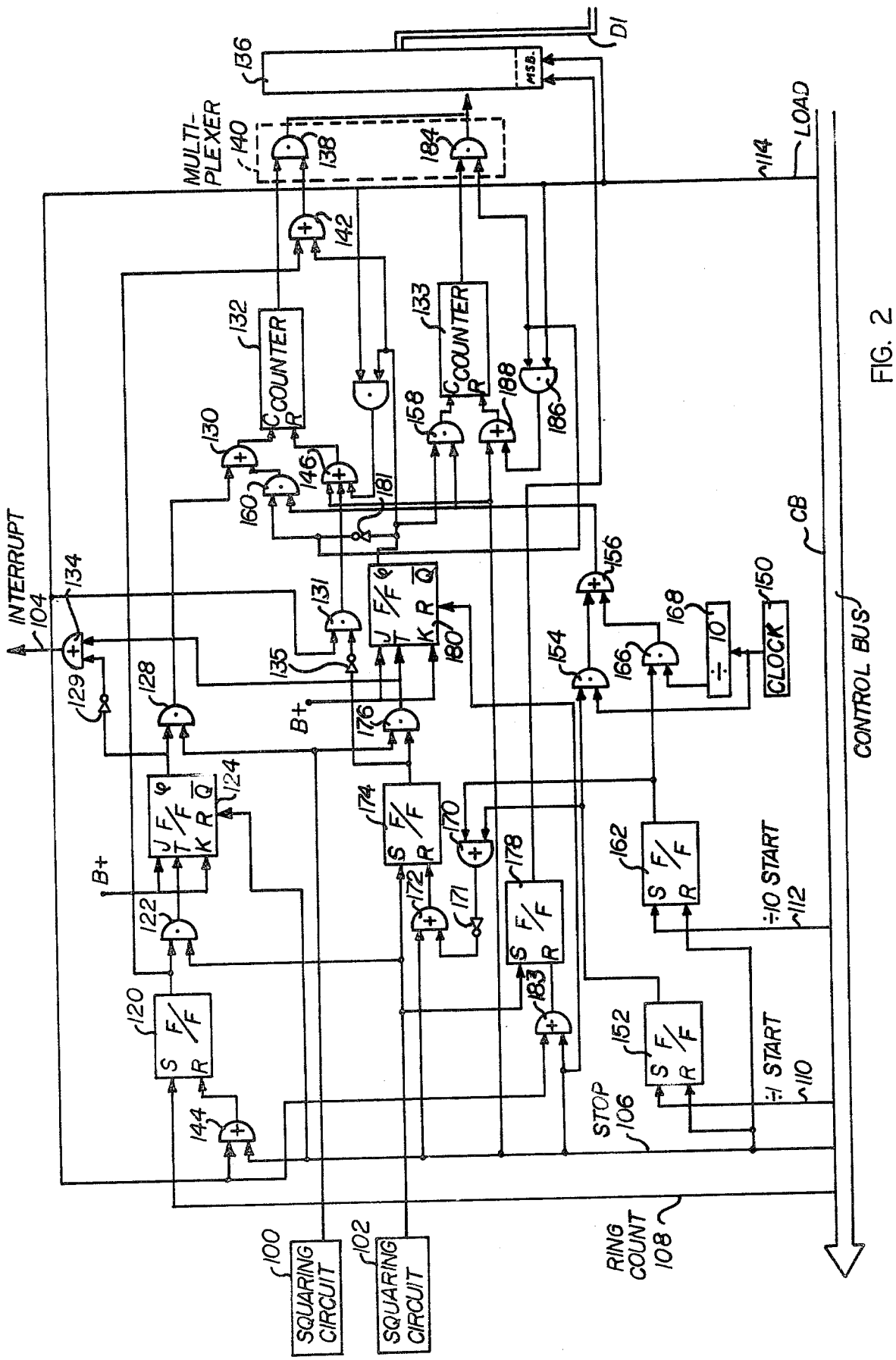
FIG. 2 is a schematic-block diagram illustration of the signal processing circuitry.

The signal processor SP is illustrated in FIG. 2. This circuit, which is under the control of the computer, serves a data collection function. Data taken into the signal processor in the form of pulses from the flywheel sensor 18 are conditioned by a squaring circuit 100 and pulses taken from the camshaft sensor 30 are conditioned by a squaring circuit 102. Each time the signal processor has processed a sample, it will raise its INTERRUPT line 104 so as to signal to the computer that a sample is ready. A control bus CB extends from the IO control and this control bus provides several control signals under program control to the signal processor. This includes a STOP control line 106 which, when raised, provides a signal to stop sampling operations. Another control line is the RING COUNT line 108 which, when raised, serves to activate the signal processor to perform a counting function and provide an output sample which provides information as to the number of teeth on the ring gear. There are two START control lines 110 and 112. When START control 110 is raised, it commands the signal processor to provide a sampling function at a normal clock speed. However, when START line 112 is raised, it commands the signal processor to perform a sampling operation at a clock speed of 1/10th that of normal. These points will be explained in greater detail below. One additional control line extending from the control bus CB to the signal processor is the LOAD control line 114. When this line is raised, it provides a command causing the samples, which has been gathered by the processor, to be sent to the CPU by DATA IN BUS DI. This sample, under program control, will be routed to a particular address in the random access memory M-2.

Depending on the program involved, a first operation of the signal processor may be considered as the RING COUNT operation. In such a case then, the control bus CB under the program control will raise its RING COUNT line 108. This applies a binary "1" signal to set a flip-flop 120. Once this flip-flop is set, it enables an AND gate 122 so that it may respond to the next crank marker pulse. The next crank marker pulse provided by the squaring circuit 102 is applied through AND gate 122 to trigger a JK flip-flop 124 to its set condition. When flip-flop 124 is in a set condition, it enables an AND gate 128. With AND gate 128 enabled, it serves to pass ring gear pulses, taken from the squaring circuit 100, through the AND gate and, thence, through an OR gate 130 to the count input C of a conventional binary counter 132. This counter will count upwards from a zero count condition (the counter had been previously reset). As each tooth on the ring gear passes sensor 18, the counter 132 will be incremented by one count. The counting will continue until AND gate 128 is disabled. This occurs in response to the next detection of a crank marker. When this occurs, another pulse is provided by the squaring circuit 102 which will now trigger flip-flop 124 to its reset condition through enabled AND gate 122. This, in turn, will disable AND gate 128. As flip-flop 124 is reset, a binary "0" signal is also supplied through an inverter 129 which, in turn, provides a binary "1" signal to OR gate 134 to raise the INTERRUPT line 104 which extends from the signal processor to the IO control. The computer now knows that the commanded sampling function (obtain a ring gear count) has been completed and that a sample is ready. Under program control, the control bus CB will now raise its LOAD line 114. This is a binary "1" signal which is applied to the load input of multi-bit parallel in-parallel out shift register 136. By way of example, the data employed herein may be 16-bit words and, hence, register 136 may take the form of a 16-bit shift register. This now permits the contents of counter 132 to be loaded into the shift register 136 through enabled AND gate 138. It is to be appreciated that the counter also takes the form of a multi-bit binary counter. Preferably, this is a 15-bit counter as is a companion counter 133, to be discussed hereinafter. The 15-bits are loaded in parallel through AND gate 138 to the least significant 15 bit positions of register 136. The most significant bit position is normally set at a binary "0" level for reasons as will be discussed in greater detail hereinafter. This 16-bit sample which is representative of the ring gear count is now available to the DATA IN BUS DI and this sample may now be processed by the computer.

When the control bus raised its LOAD line 114, this also stopped the ring gear count by applying a binary "1" signal through an OR gate 144 to reset flip-flop 120 and reset counter 132 through enabled AND gate 131 and OR gate 146. AND gate 131 is enabled by disabled flip-flop 174 through inverter 135. The circuit is now ready to perform another function.

Under the program control, the next function to be performed by the signal processor may be the collection of time interval samples. Each is the time interval occurring between successive crankshaft positions as represented by successive ring gear teeth. This operation may be commenced under program instructions by the control bus CB raising either START control line 110 or START control line 112, depending upon the clock rate desired. For example, a power performance test will be described hereinafter and during that test the clock rate to be in effect will be the normal clock rate. The normal clock rate in this embodiment is a 10 MHz clock rate with the clock pulses being derived from a suitable clock 150. Another test to be described herein is a compression test and, during this test, the clock rate in effect will be 1/10th the normal clock rate. Consequently, then, if the normal clock rate is desirable, the control bus CB will raise its START line 110. If a slower clock rate is desired, the control bus will raise START line 112.

Assume, for example, that control bus raised START line 110, as for a power performance test. This will cause a binary "1" signal to be applied so as to set a flip-flop 152. This, in turn, will enable AND gate 154 so as to pass clock pulses at the normal rate from clock 150 through the AND gate and, thence, through an OR gate 156. The clock pulses, as passed by OR gate 156, will be applied through either an AND gate 158 or an AND gate 160 to the clock input C of counters 133 and 132 respectively. Only one of these counters will be active at any one time and this will be described hereinafter.

If, on the other hand, the control bus had raised START line 112, then this would set a flip-flop 162. This would, in turn, enable an AND gate 166 so as to pass clock pulses from clock 150, as descreased in clock rate by a divide-by-ten circuit 168. The slower clock pulses would then be passed through OR gate 156 to the active counter. Whether START line 110 or 112 is raised, the operation is essentially the same except for the clock rate. Thus, the setting of flip-flop 152 causes a binary "1" signal to be applied through an OR gate 170 and be inverted by an inverter 171. A binary "0" signal will now be applied through an OR gate 172 to remove the previous reset signal to a flip-flop 174. Similarly, if flip-flop 162 is set by raising START line 112, a binary "0" signal is applied through OR gate 172 to remove the reset input of flip-flop 174.

The circuit will now wait for the camshaft sensor 30 to detect a crank marker on the camshaft 24 of the engine DE. Once the bolt or marker 28 has been detected by the sensor, a crank marker pulse is applied by the squaring circuit 102 to set flip-flop 174. This enables an AND gate 176 so as to pass ring gear pulses from the squaring circuit 100. When flip-flop 174 is set by the crank marker pulse, the pulse also sets a flip-flop 178. This flip-flop then applies a binary "1" signal to the most significant bit position MSB of shift register 136. As was previously discussed, this bit position is normally set with a binary "0" signal. However, when a sample of an interval time is also representative of the detection of a crank marker, then this sample will be provided with a binary "1" signal level in the most significant bit position. The sample which identifies the crank marker provides the computer with information as to the location of the crank marker relative to an interval time associated with a particular tooth on the ring gear. In the example being discussed, it is to be kept in mind that the ring gear will make two revolutions for each revolution of the camshaft and only one of the 236 samples will include the crank marker information. The computer is programmed such that it knows which succeeding sample is representative of the top dead center crankshaft position in the next power period. Since the firing order is known, this then identifies the tooth samples with the correct cylinders.

There are sufficient teeth on the ring gear such that the detection of the crank marker by sensor 30 is essentially coincident with the detection of a ring gear tooth by sensor 18. With both of these pulses being detected, the ring gear pulse is passed by AND gate 176 to trigger a flip-flop 180 to its set condition. With flip-flop 180 being set, it enables AND gate 158 to pass clock pulses from OR gate 156 to the count input C of counter 133. Counter 133 will now count these clock pulses until detection of the next ring gear tooth. When this occurs, flip-flop 180 will be triggered through enabled AND gate 176. Also, the detection of the next ring gear tooth causes a binary "1" signal to be passed by OR gate 134 so as to raise the INTERRUPT line 104 to signal to the computer that the first sample has been collected. The time interval count as represented by the count in counter 133 will, under program instructions, be loaded into the 15 least significant bit positions of the 16-bit shift register 136. The count that will be loaded will be the count then existing in counter 133 and this will be passed through an AND gate 184 in the multiplexer 140. This AND gate is enabled to pass the count in response to flip-flop 180 being triggered to its reset condition through inverter 181. The 15-bit count will be loaded into the 15 least significant bit positions of register 136 in response to the LOAD line 114 being raised. Also, the binary "1" signal from flip-flop 178 will now be loaded into the most significant bit position MSB of register 136. This 16-bit sample which represents a time interval between two successive occurrences of ring gear pulses is now available on the DATA IN BUS DI and, under program instructions, will be loaded at a particular address into the random access memory M-2.

Flip-flop 178 was reset through OR gate 183 in response to the control bus raising its LOAD line 114 so that a binary "0" signal is now applied to the most significant bit position of register 136 for the succeeding samples. Also, when the LOAD line 114 was raised, it also served to reset counter 133 through AND gate 186 and OR gate 188. Since flip-flop 180 has been reset, AND gate 158 is disabled and prevents clock pulses from being passed to the counter 133. Instead, the next succeeding time interval is being counted by counter 132. That is, flip-flop 180 is now in its reset condition which provides a binary "0" to inverter 181 which, in turn, provides a binary "1" to enable AND gate 160 so as to pass the clock pulses through OR gate 130 to the clock input C of counter 132. This counter will now count the clock pulses received from clock 150 until the next detection of a ring gear tooth. When this occurs, a flip-flop 180 will be triggered thereby disabling AND gate 160 to prevent clock pulses from being passed to the counter 132. In addition, a binary "1" signal is also applied through the OR gate 134 to raise the INTERRUPT line 104 so as to alert the computer that a second sample is ready to be loaded into the random access memory M-2. In response, the computer will cause the control bus CB to raise its LOAD line 114 so as to load the contents of counter 132 into the shift register 136 so that it is available on the DATA IN BUS. In addition, when the LOAD line 114 is raised, a binary "1" signal is passed by an AND gate 190 and, thence, through OR gate 146 to reset counter 132. Since flip-flop 180 is now in its set condition, it enables AND gate 158 to pass clock pulses from the clock so as to be counted by counter 133 to obtain the time interval for a third sample.

This operation continues with alternate time interval samples being counted by counters 132 and 133 until the computer has determined that sufficient number of samples, pursuant to the program control, has been obtained. At that point in time, the computer will then cause the control bus CB to raise its STOP control line 106 to reset all flip-flops as well as reset counters 132 and 133. This completes the data collection operation and the computer will, now under program control, perform a diagnostic analysis based on the samples taken.

PERIPHERALS

As noted in FIG. 1, the other peripherals to the input/control control IO include the visual display DP, the printer PR, the tape reader TR, and the keyboard KB. Unlike the signal processor SP described with respect to FIG. 2, these additional peripherals may take the form of conventional state-of-the-art devices and, in themselves, do not form a part of the present invention. It is preferred, however, that such peripherals be provided and be suitable for use with a computer of the type described herein. For example, it is contemplated that the present invention may be employed for testing various types of engines and that different test programs may be recorded on a suitable storage device, such as cassette tape TA. In this case, the computer may need identification from an operator as to which engine type is to be tested so that the tape reader TR can read the appropriate test program on the tape TA. This information is provided to the computer by suitable keyboard KB. Under computer control, the keyboard may be enabled by raising a control line 200 so that data entered into the keyboard may be applied by the input/output control IO to the CPU. During the transmission of data, the keyboard may raise its busy line 201 to indicate to the computer that the keyboard is busy. The computer may actuate the tape reader TR through a suitable control line 202 to cause the tape reader to read a particular section of the tape TA at which the test program is located. This information will then be fed back to the computer by way of a suitable data line 204. During the reading of the tape, the tape reader may raise its busy line 206 to let the computer know that the tape reader is busy. Thereafter the computer will execute its stored programs, both those taken from a tape TA and stored, for example, in the random access memory M-2, as well as other programs which may be in the random access memory or in the read-only memory M-1. The program may involve taking samples as discussed previously, together with a diagnostic analysis program with respect to the samples taken. The printer PR serves the function of providing a print-out of the results of the diagnosis made by the computer. Consequently, when the computer outputs the results to the printer, it may do this by raising a control line 210 to actuate the printer PR which then will provide a print-out of the data provided on the input/output DATE OUTPUT BUS IOB-O. While the printer is providing its printing function, it may signal its busy condition to the CPU by raising its busy line 212. Similarly, the video display DP is used to provide a visual display to the operator of certain messages such as commands for the operator, as well as computer output results. This is accomplished under program control by the computer raising a control line 214 to actuate the display DP to provide a visual display of the data provided on the IO DATA OUTPUT BUS IOB-O.

The I/O control may conventionally include a plurality of gates to perform a multiplexing function to allow one of the peripherals to communicate with the CPU. In the event that the only peripheral involved is the signal processor, then the I/O control is non-existent or at least quite simple. Thus, the signal processor could communicate essentially directly with the CPU.

COMPRESSION TEST

Figure 3:
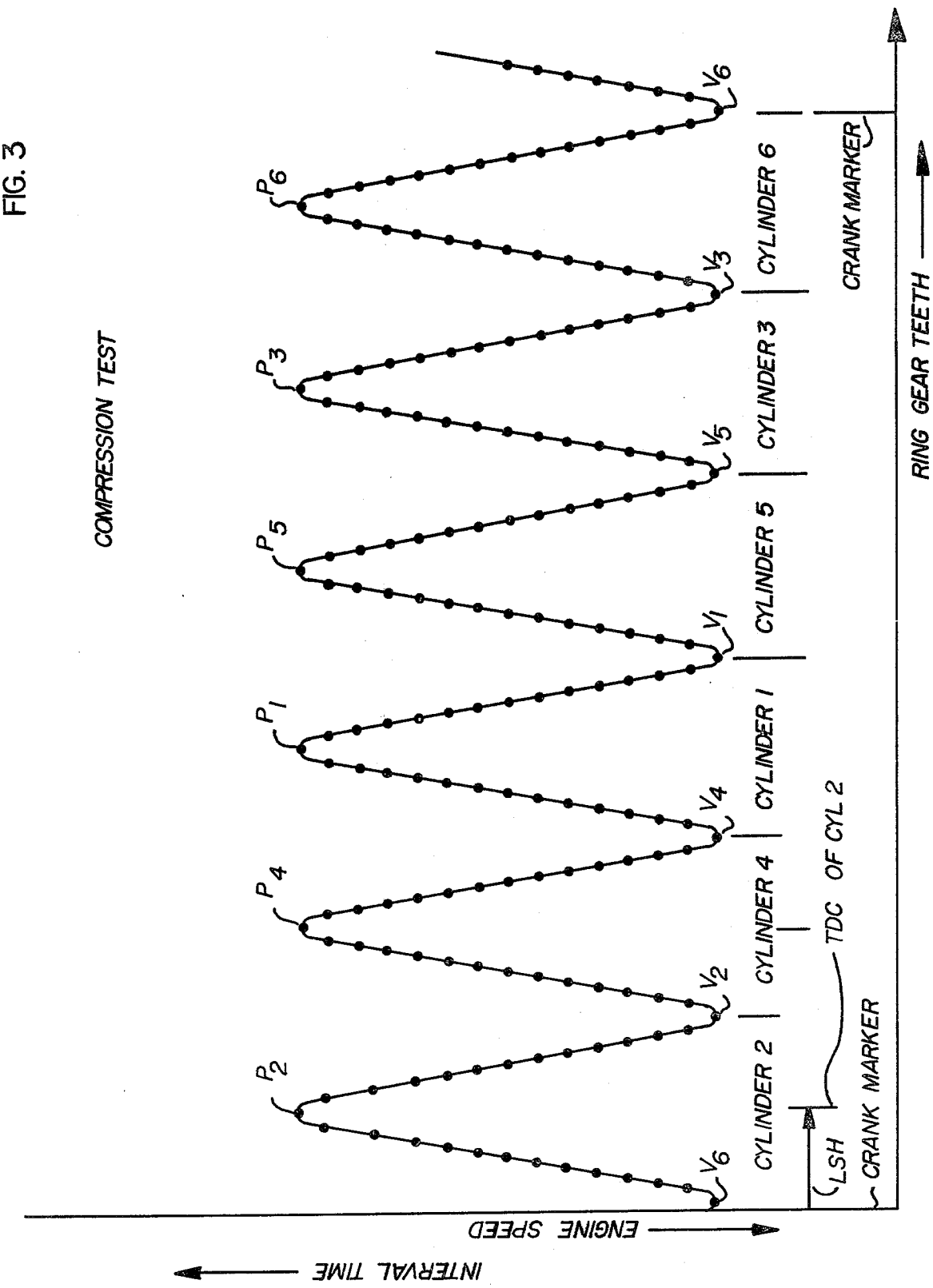
FIG. 3 is a chart of interval time with respect to ring gear teeth illustrating the fluctuations of a normal engine with the crankshaft being driven by a crank motor.

Reference is now made to FIG. 3 which is a curve made by connecting points which have been plotted and which are representative of interval times with respect to ring gear teeth. As will be recalled, the signal processor SP times the intervals between successive ring gear pulses so that for one engine cycle of the embodiment being described there are 236 interval times. FIG. 3 represents a plot of interval times for a normal engine which is operating without power, but is being cranked as with a starter or crank motor 15. The plot points shown in FIG. 3 are by way of illustration only, it being understood that there are some 236 such points. In the plot the upward slopes, for example from point $V_6$ to point $P_2$, represent compression strokes on the various cylinders, whereas the downward slopes on the curve, such as from point $P_2$ to point $V_2$, represent the power or acceleration strokes. It is to be remembered that whereas the interval time is plotted in an increasing direction in the upward direction of FIG. 3, engine speed varies in the opposite sense.

From the previous discussions relating to data sample collection, it is recalled that a crank marker is detected by the camshaft sensor 30 and the time interval sample taken at that time is the crank marker sample (the most significant bit is set to a binary "1" level). The location of this crank marker relative to a given crankshaft position is known. This is illustrated in FIG. 3 and that the number of ring gear teeth LSH from the crank marker identifies point $P_2$ as the top dead center crankshaft position of cylinder number 2. This then provides sufficient information for the computer to identify the top dead center crankshaft positions $P_1$, $P_3$, $P_4$, $P_5$, and $P_6$ of cylinders 1, 3, 4, 5, and 6 because the computer is programmed such that it knows the firing order, i.e., cylinders 1-5-3-6-2-4-1. Also, the computer can now identify the valley positions $V_1$, $V_2$, $V_3$, $V_4$, $V_5$, and $V_6$.

Figure 4:
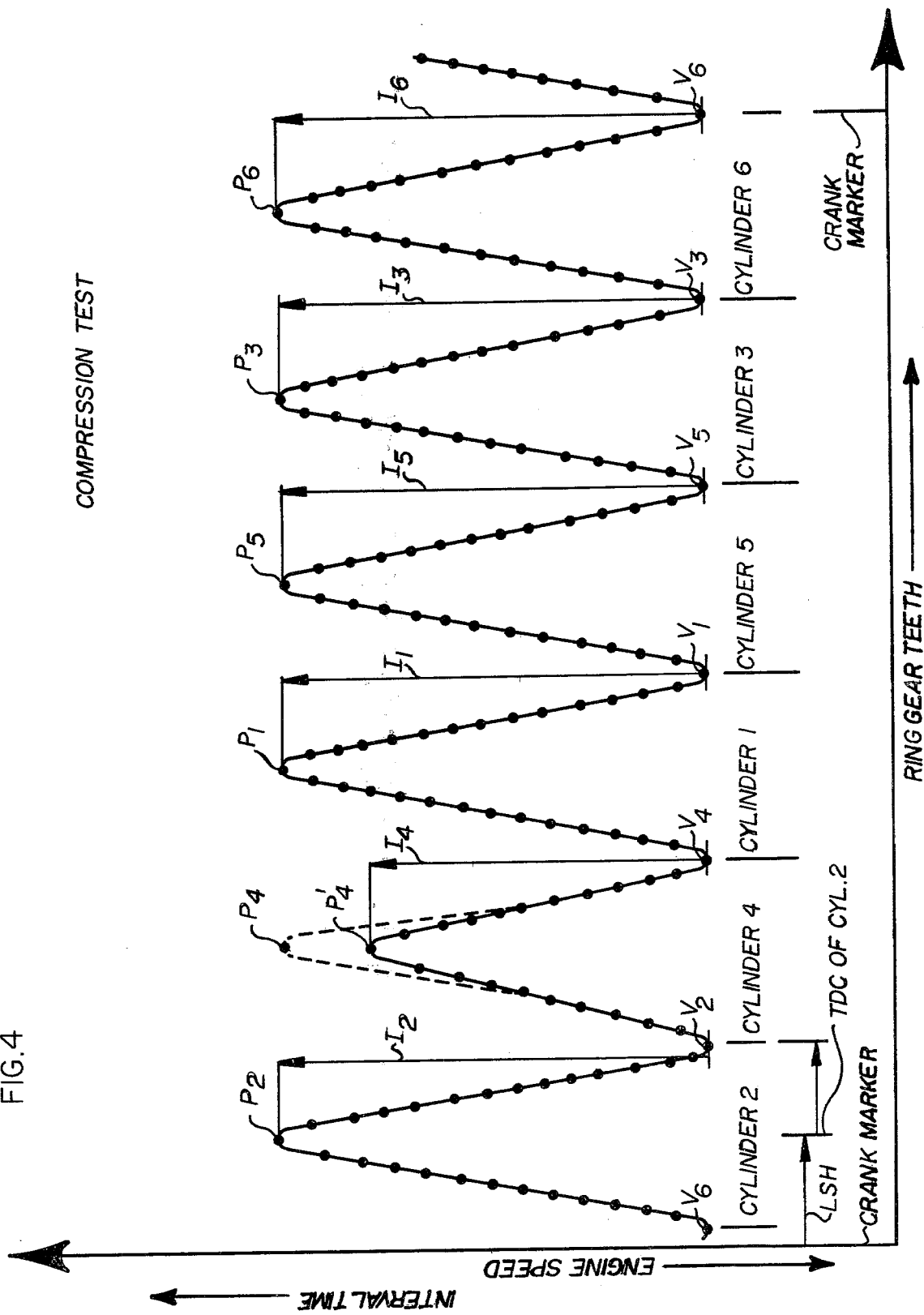
FIG. 4 is a chart similar to that of FIG. 3, but illustrating the fluctuations occurring with a low compression condition in one of the cylinders.

The plot in FIG. 4 is essentially the same as that of FIG. 3, but shows the variations which occur with a low compression fault condition existing at cylinder 4. It will be noted that the peak point $P_4'$ is substantially lower than that of the peak point $P_4$ for the normal engine. Thus, what has happened is that as the piston moved in an upward direction toward its top dead center position, the time intervals became shorter and shorter with respect to that of the normal curve. This is representative of low compression in cylinder 4. This may be because of a leaky valve in the cylinder or worn rings on the piston or a faulted head gasket or perhaps a hole in the piston. Any one or combination of these faults would be responsible for a low compression condition existing at cylinder 4.

The computer is programmed to compare the interval times at the peaks and the succeeding valleys. With reference to FIG. 4, the computer looks at the time interval at peak point $P_2$ and subtracts from that value the time interval at the valley $V_2$ to obtain the value corresponding with compression index $I_2$. The value of index $I_2$ is a measure of the acceleration of the piston in cylinder 2 during the stroke from the peak point $P_2$ to the valley point $V_2$. The computer is programmed to perform this calculation for each of the cylinders to obtain the values of compression indices $I_2$, $I_4$, $I_1$, $I_5$, $I_3$, and $I_6$. With respect to the measurements taken for the plot of FIG. 4, it is noted that the compression index $I_4$ is substantially lower than that for indices $I_1$, $I_2$, $I_3$, $I_5$, and $I_6$. This is because of the low compression in cylinder 4 caused by gas leaking during the compression stroke thereby providing less resistance to the movement of the piston in the upward direction and less pressure to help movement in the downward direction.

The computer is programmed to determine the average of the compression indices. The average compression index may be considered as $I_A$ where:

$$I_A = \frac{I_1 + I_2 + I_3 + I_4 + I_5 + I_6}{6} \quad \text{(Eq. 1)}$$

After the average compression index $I_A$ is calculated, the computer compares the compression index of each cylinder with the average to obtain the compression ratio. Thus:

$$\text{Compression ratio (cylinder 1)} = I_1/I_A \quad \text{(Eq. 2)}$$

This ratio then is made for each cylinder to obtain the compression ratios. Table I below is an exemplary table showing cylinder and compression ratios with a faulted cylinder 4.

TABLE I

| Cylinder No. | Compression Ratio |
|---|---|
| 1 | 1.03 |
| 5 | 1.03 |
| 3 | 1.00 |
| 6 | 1.06 |
| 2 | 1.02 |
| 4 | 0.86 |

From Table I, it is seen that a compression ratio of 0.86 for cylinder 4 is indicative of low compression.

The computer is also programmed to compare each of the compression ratios, such as those in Table I, with a threshold for determining whether any cylinder is to be considered as being faulted. For example, if any compression ratio has a value less than 0,90, then this will be considered as a faulted cylinder. In the example being given, the threshold comparisons would indicate that such a faulted condition exists for cylinder 4. The computer will now cause a read-out as by printer PR (or by a visual display such as display DP if desired) to provide a read-out of this condition. The read-out then by the printer might state LOW COMPRESSION—CYLINDER 4. The read-out may also provide the information shown in Table I.

POWER PERFORMANCE

The power performance test is made with fuel being supplied to the engine under test and a determination is made of the power performance of the various cylinders. The power performance test may be referred to as a snap throttle test since it requires the operator to rapidly accelerate the engine as by snapping the throttle control so that the engine speeds up from some idle speed toward some higher speed.

Figure 5:
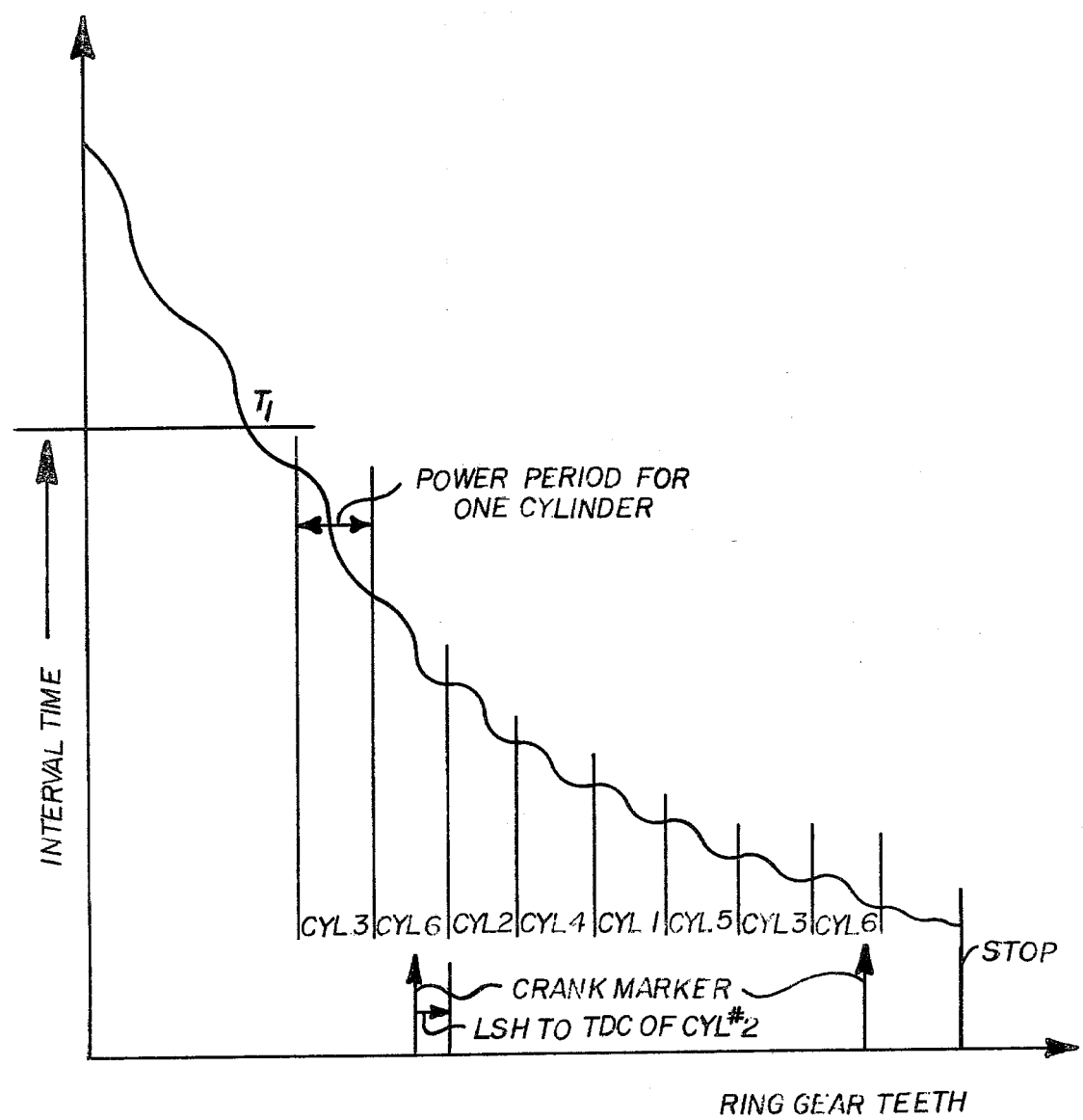
FIG. 5 is a chart of interval time with repect to ring gear teeth and showing the fluctuations as a normal engine is rapidly accelerated with fuel supplied from one speed to a higher speed.

The operation involved in the power performance test will now be described with reference to FIGS. 5, 6, and 7. The curve in FIG. 5 shows a plot of time intervals with respect to ring gear teeth. It is to be remembered that speed varies inversely with interval time. The plot shows a normal engine operating during the snap or full throttle acceleration condition. The test will start at some desired idle speed such as 600 rpm and the computer, sensing the engine is operating at that speed, will instruct the operator to begin the test by displaying BEGIN SNAP on the video display DP. The operator now rapidly advances the throttle to the maximum fuel position. As the speed increases, the computer continues to periodically check the engine speed for a threshold level which designates a point after which valid samples may be taken for the test procedure. The monitoring of the engine speed may be done in various ways, such as externally of the computer as with a tachometer or the like, or by acquiring ring gear interval times since the reciprocal of the interval time is indicative of engine speed.

Once the engine speed attains a level corresponding with the threshold level $T_1$ (see FIG. 5), the computer will commence gathering time interval samples for storage. Sufficient samples should be taken for at least one engine cycle. Once this group of samples has been taken and stored in the memory, the computer may make its diagnostic analysis of the time interval samples. At this time, the computer may also notify the operator as by displaying END SNAP on the visual display DP to alert the operator that the sampling has been completed. The operator may now reset the throttle to the minimum fuel position.

The interval sample containing the first detected crank marker has a known relationship to the location of the top dead center position of the first cylinder which immediately follows the crank marker. In the illustration given in FIG. 5, the distance, in ring gear teeth, is indicated as LSH from the crank marker to the top dead center of cylinder 2. Since the firing order is known; to wit, 1-5-3-6-2-4-1 etc., the interval samples in FIG. 5 may now be associated with specific power periods for the respectively associated cylinders.

Figure 6:
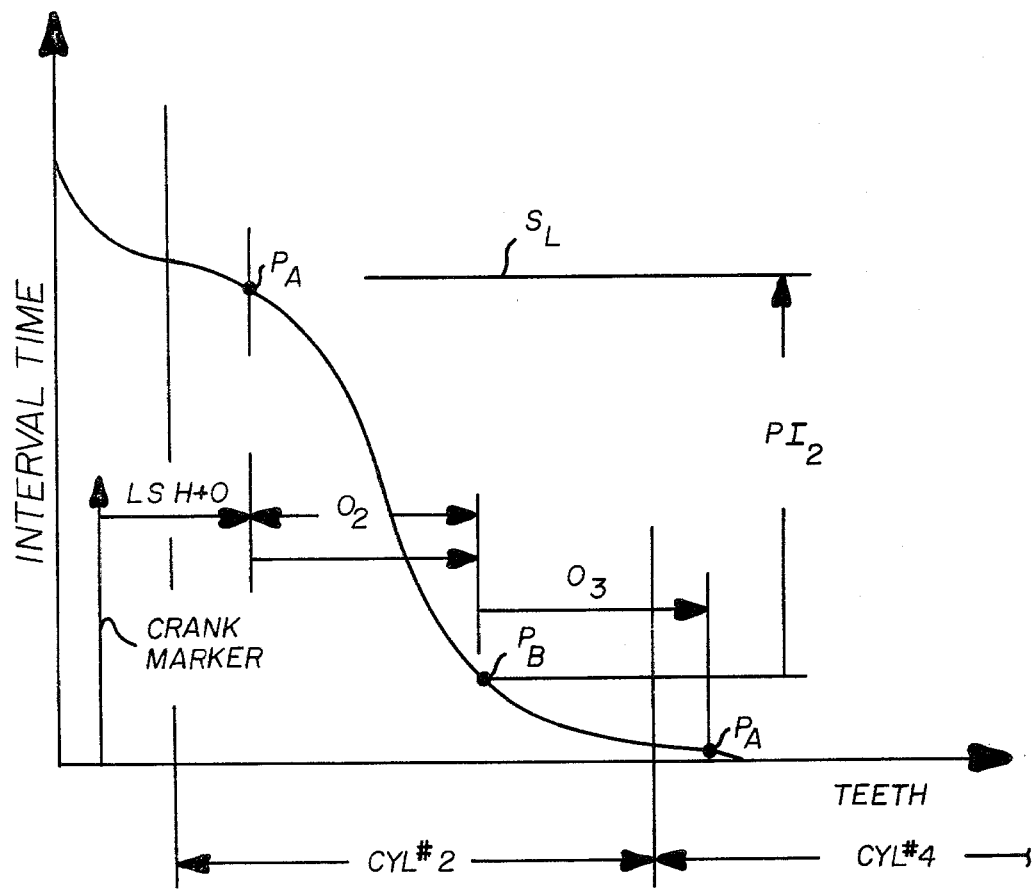
FIG. 6 is an enlarged section of the graph of FIG. 5 and is used in conjunction with the description of operation given herein.
Figure 7:
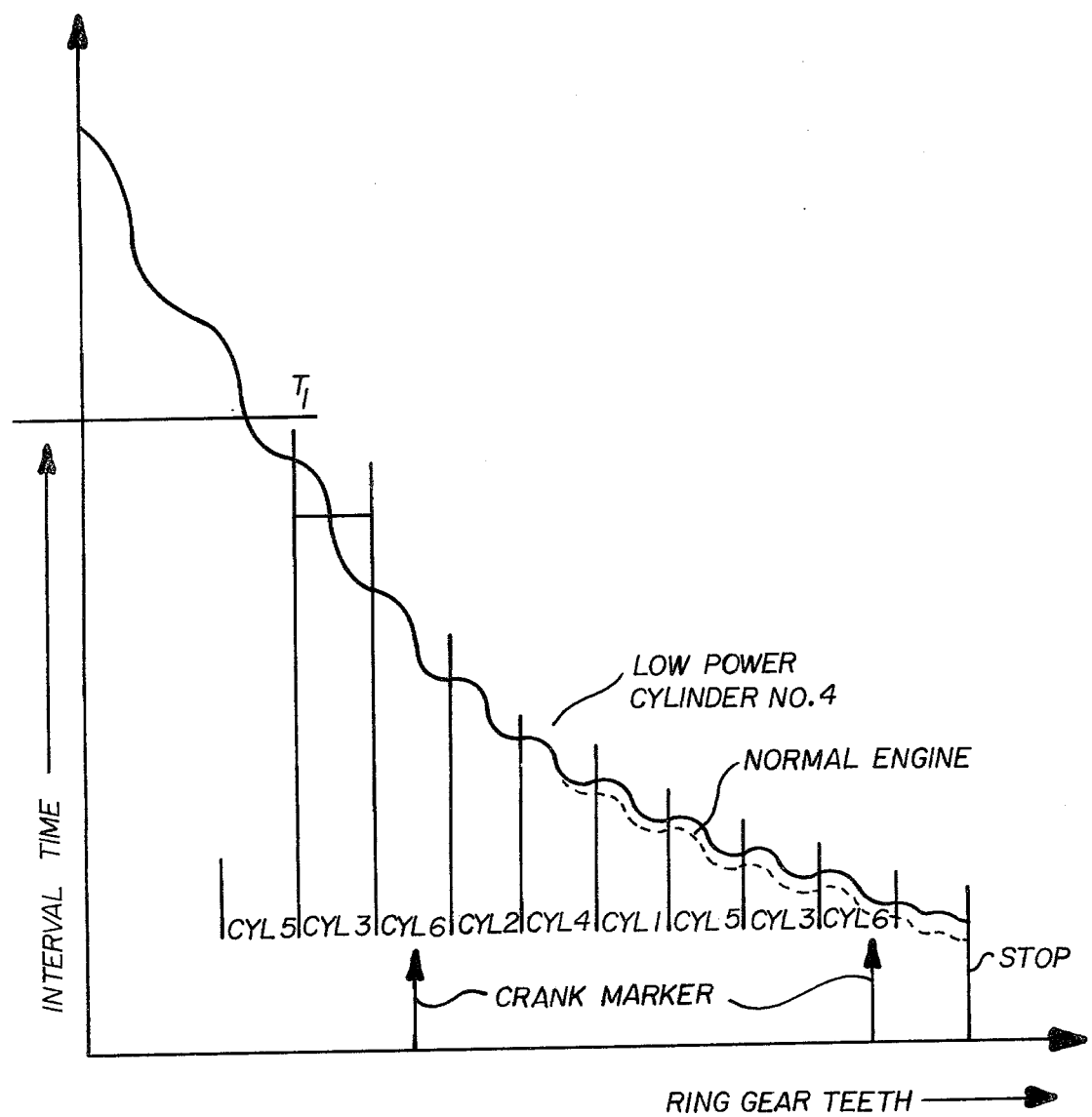
FIG. 7 is a chart similar to that of FIG. 5, but illustrating the fluctuations occurring with low power performance in one of the cylinders.

FIG. 6 is an enlarged section of the plot of FIG. 5 for the power period for cylinder number 2. In this test, interval samples within each power period are to be compared with each other to obtain a power index PI. The power indices for the respective cylinders are then compared. The interval time samples of two points in the power period are examined. Preferably, these two points both take place during the acceleration stroke portion of the power period and, for example, with respect to FIG. 6, these points may be considered as points $P_A$ and $P_B$, each representative of the interval time between successive ring gear teeth at different locations on the ring gear during the power stroke. As will be recalled, the power stroke is the period during which the piston is accelerating due to the combustion of the gases above the cylinder. So as to be sure that the first point $P_A$ is beyond the location of the top dead center an offset $O_1$ is added to the top dead center position LSH relative to the crank marker position. The value of offset $O_1$ in the ring gear teeth is dependent on the engine type being tested. This then has identified sample point $P_A$. The next sample point $P_B$ within this same power period, is obtained by adding an additional offset $O_2$ from the location of the first sample point $P_A$. The computer is programmed to perform this function in selecting the test sample points $P_A$ and $P_B$. The sample point $P_B$ in the first power period has a known distance in terms of gear teeth from the next sample $P_A$ for the next cylinder, cylinder number 4. This offset may be termed as offset $O_3$. Consequently, each sample point $P_A$ is taken at the same relative crankshaft position in each power period, as is also true with each sample point $P_B$. The power index PI for each cylinder is obtained by subtracting the value of the interval time at point $P_B$ from the interval time at point $P_A$. Thus, the power index for each cylinder is calculated in accordance with the formula:

$$PI = P_A - P_B \qquad \text{(Eq. 3)}$$

For the six cylinder engine being discussed, the computer will now calculate, in accordance with equation 3, the power indices $PI_1$, $PI_2$, $PI_3$, $PI_4$, $PI_5$, and $PI_6$ for cylinders 1–6 respectively. Thus, a table is obtained corresponding with Table II below.

TABLE II

| Cylinder No. | PI |
| --- | --- |
| 2 | $PI_2$ |
| 4 | $PI_4$ |
| 1 | $PI_1$ |
| 5 | $PI_5$ |
| 3 | $PI_3$ |
| 6 | $PI_6$ |

From an examination of Table II, the computer has now determined the acceleration (power index) contribution of each cylinder.

From an examination of FIG. 5, it will be apparent that as the power indices are calculated for the cylinders in the firing order of 2-4-1-5-3-6, the respective power indices associated with these cylinders will become decreasely smaller for a normal operating engine. This is because the engine is accelerating and the time required for the engine to cause the crankshaft to turn one crank position, i.e., from one ring gear positon to the next, will become decreasingly smaller as the samples are taken. For a given type engine, the amount by which these power indices decrease is known since the slope of the plot of FIG. 5 is known. Thus, for example, with reference to FIG. 6, the computer can determine the speed S at which sample point $P_A$ is taken. Since the slope of the plot in FIG. 6 is known for a normal engine, then the power index PI can be normalized or corrected from one cylinder to the next in accordance with the following formula:

$$PI' = PI - G(S) + H \quad \text{(Eq. 4)}$$

where G, H are constants of the particular engine series being tested and PI' is the corrected power index. The values then in Table II are now collated in accordance with Table III.

TABLE III

| Cylinder No. | PI | S | PI' |
|---|---|---|---|
| 2 | $PI_2$ | $S_2$ | $PI_2'$ |
| 4 | $PI_4$ | $S_4$ | $PI_4'$ |
| 1 | $PI_1$ | $S_1$ | $PI_1'$ |
| 5 | $PI_5$ | $S_5$ | $PI_5'$ |
| 3 | $PI_3$ | $S_3$ | $PI_3'$ |
| 6 | $PI_6$ | $S_6$ | $PI_6'$ |

The computer will now serve to compute the average corrected power index, $PI_A'$, in accordance with the following formula:

$$PI_A' = \frac{PI_1' + PI_2' + PI_3' + PI_4' + PI_5' + PI_6'}{6} \quad \text{(Eq. 5)}$$

Having obtained the average value of the corrected power indices, the computer will now compare the value of each corrected power index to the average power index in accordance with the following formula:

$$\text{Power index ratio} = (PI'/PI_A') \quad \text{(Eq. 6)}$$

Table IV below provides representative values of the ratios of the corrected power index for each cylinder relative to the corrected average power index.

TABLE IV

| Cylinder No. | Ratio |
|---|---|
| 1 | 1.05 |
| 5 | 1.05 |
| 3 | 1.02 |
| 6 | 1.08 |
| 2 | 1.04 |
| 4 | 0.76 |

It will be noted from Table IV, that the power index ratio of cylinder 4 is indicative of a low power performance. This is represented in the plot of FIG. 7. This plot is quite similar to that of FIG. 5, but shows the variations resulting from a faulted engine with a fault being in cylinder 4. The power loss will cause the curve to be somewhat higher in FIG. 7 as indicated by the dotted line. The fault occurred in cylinder 4 because of low power performance. This may be the result of a faulty fuel system in that fuel is improperly injected into cylinder 4.

The computer is also programmed to compare each of the computed ratios of Table IV with a threshold. In this case, the threshold may be 0.90. If any of the power index ratios is less than 0.90, the computer will output a message identifying which cylinder exhibits an unacceptable low power level. In the example being given then, the computer would output the message LOW PERFORMANCE, CYLINDER 4. This message may be outputted by way of the visual display DP or with a read-out by means of printer PR. In addition to the low performance message, the computer will also provide an output message providing the information shown in Table IV so that the operator may have a comparative read-out of the power performance of the various cylinders. This message may likewise be provided by either the video display DP or the printer PR under computer control. In the event that the computer determines that the ratio comparison against the threshold level is satisfactory, then the display will be ENGINE PASS PERFORMANCE TEST. This message may be displayed as with the video display DP or printer out by the printer PR. This completes the power performance test.

SUMMARY

In summation, a fault condition of one or more cylinders of an engine is determined by the various embodiments described herein by providing a plurality of samples, each of which is a measure of the interval time between successive crankshaft positions of an engine. In the specific embodiments described, the crankshaft positions are noted by sensing the passage of ring gear teeth. However, the time duration between the successive crankshaft positions could be determined in other ways such as with suitable markers on a crankshaft to which a photoelectric sensor responds. During an engine cycle, a sufficient number of these successive time interval measurements are collected. Several samples are collected for each power period, the period during which a cylinder undergoes both a compression stroke as well as an acceleration stroke.

Figure 8A:
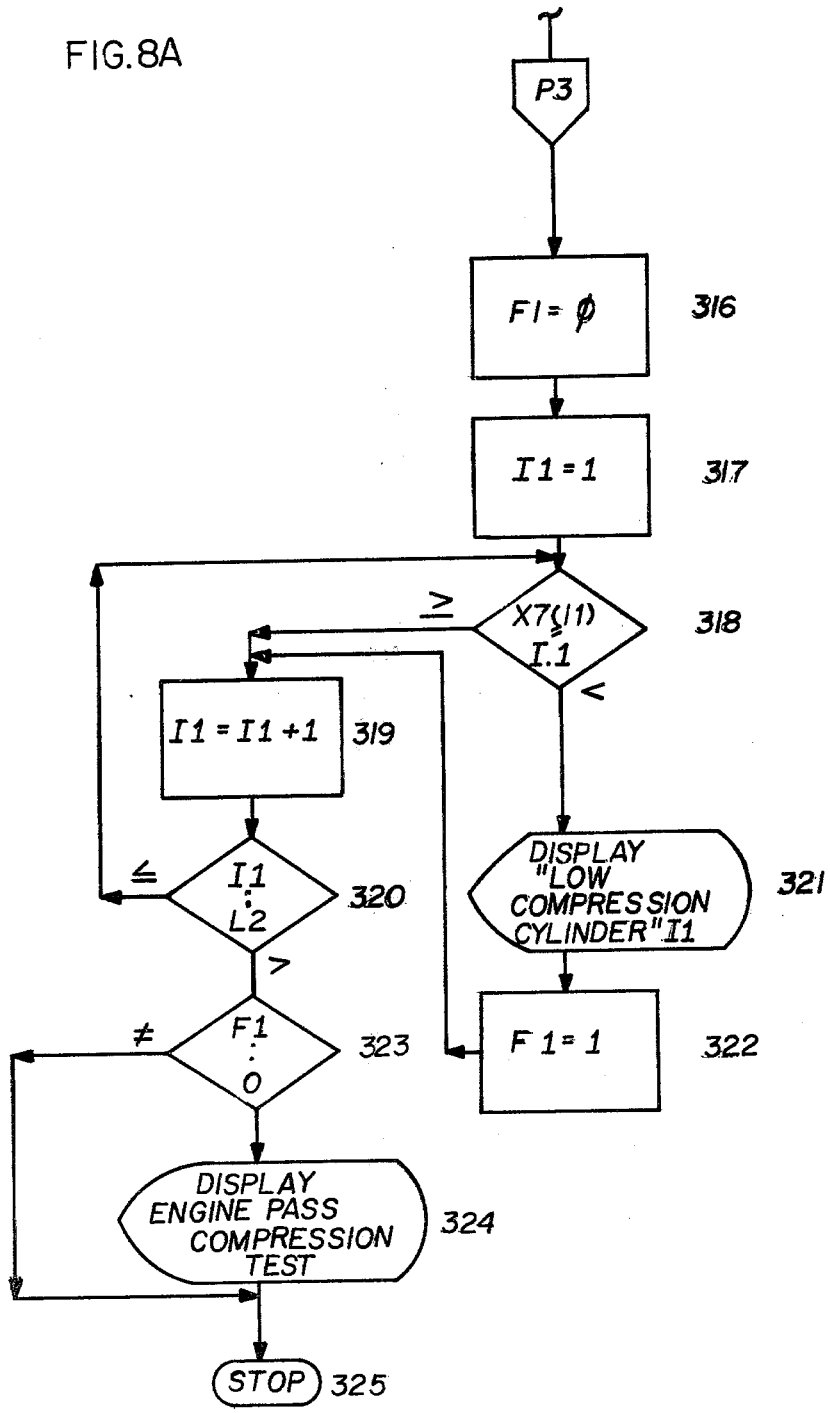
Figure 9:
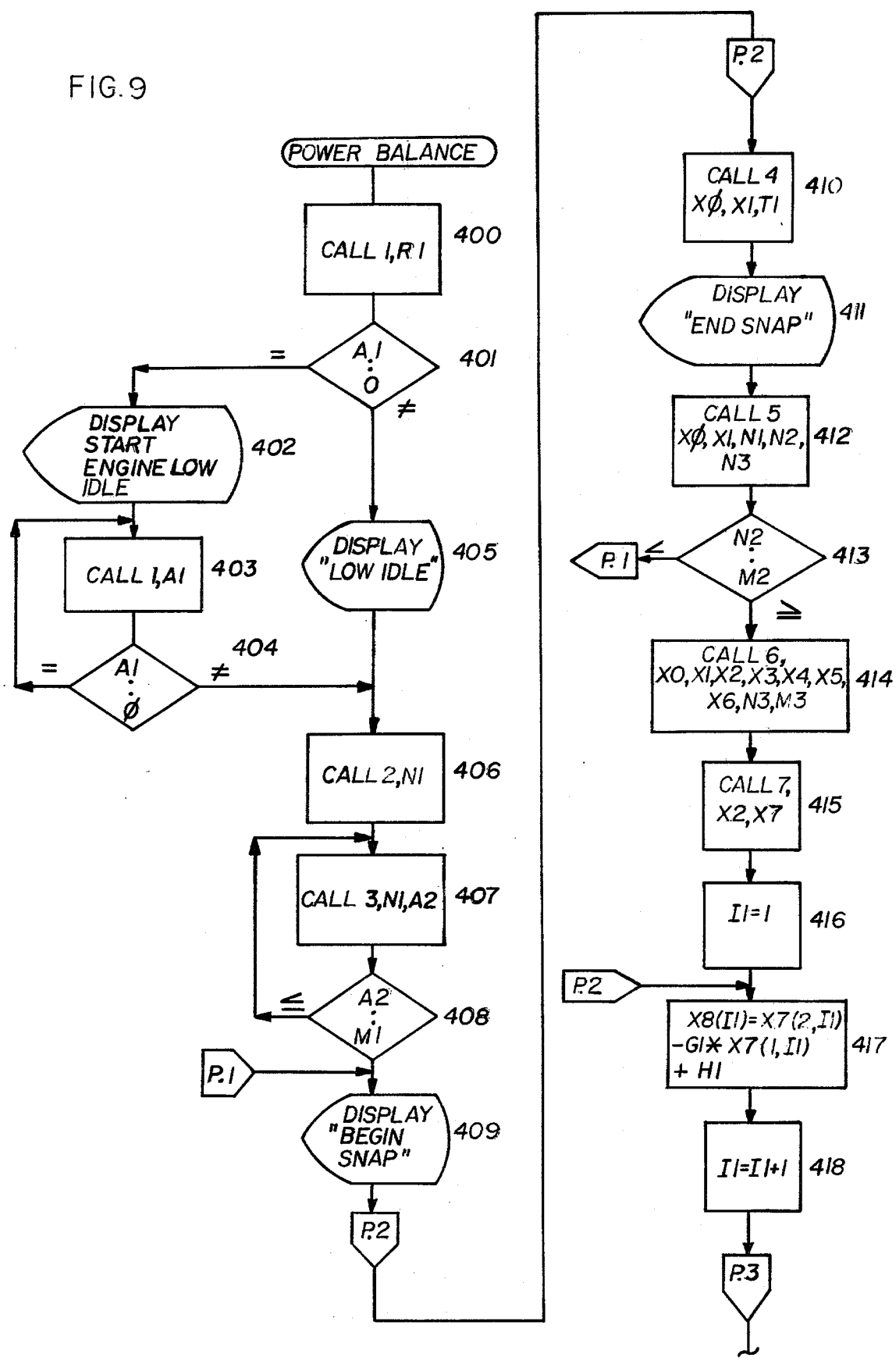
Figure 9A:
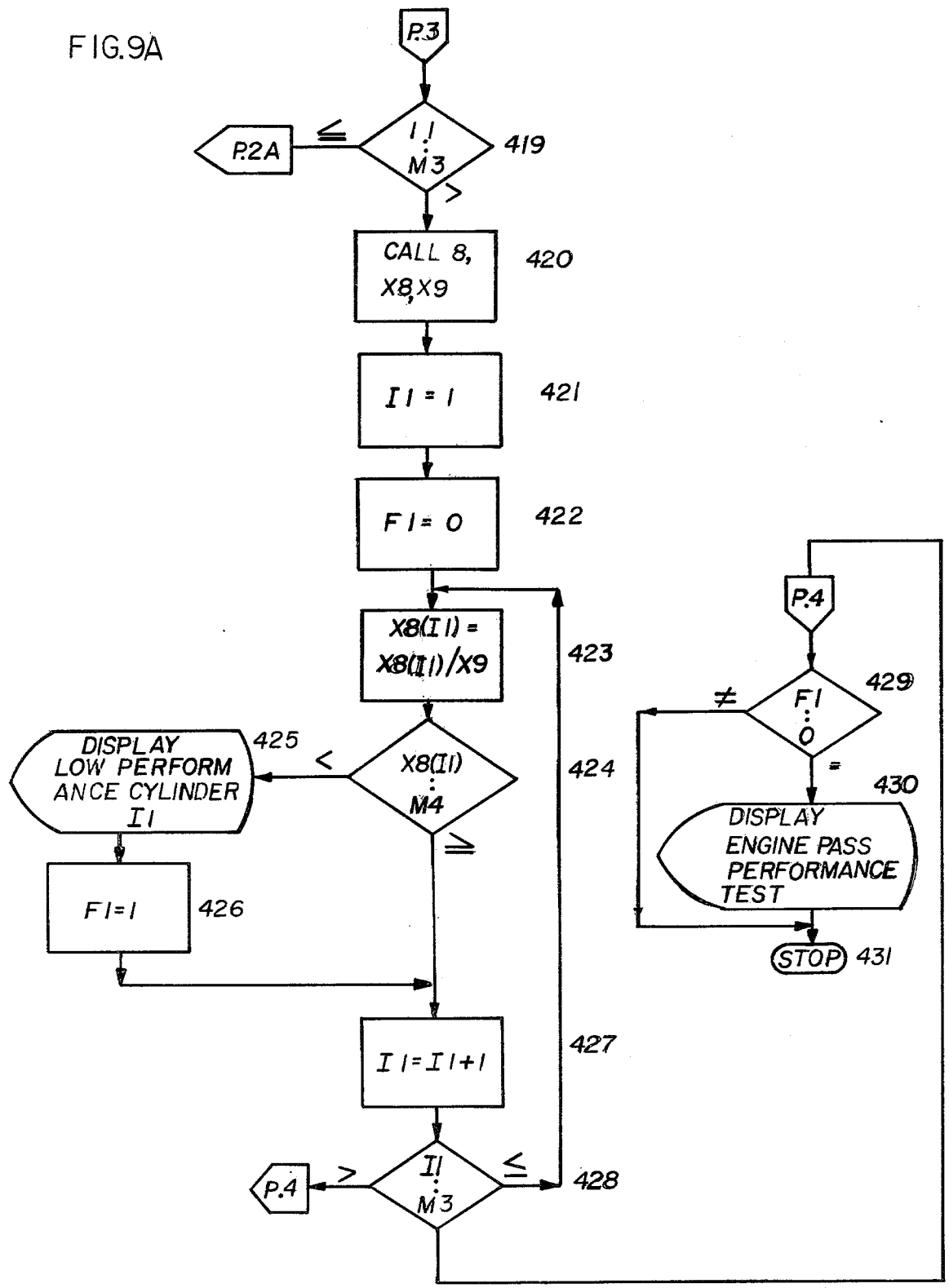

Certain samples for each power period are then examined to obtain a difference in time intervals between the samples. A relative balance is made between these comparisons to determine an unbalanced condition, such as low compression or low power in one of the cylinders. This unbalanced condition is then used to identify a fault condition existing in one of the cylinders. It is preferred that these functions be performed by a programmed general purpose computer such as the type of computer described herein with reference to FIG. 1. Whereas the signal processor has been described in conjunction with the specific hardware shown in FIG. 2, it is to be understood that the functions performed by the signal processor could be performed by the computer under program control as opposed to separate hardware. The manner in which the computer operates will now be described in detail in Appendix A with respect to the flow diagrams of FIG. 8 for the operation involving the compression test discussed hereinbefore and in Appendix B in conjunction with the flow diagram of FIG. 9 for the power performance test described hereinbefore.

APPENDIX A

COMPRESSION TEST

| Statement No. | Program Step and Description |
|---|---|
| 300 | CALL 1, A1. This instruction invokes a procedure which accepts input from the ring gear sensor. The input sequence is initiated by a divide by one output instruction. If the engine is powered up, interrupts are generated for each ring gear tooth as it passes the sensor. The presence of a single interrupt, |

APPENDIX A-continued
COMPRESSION TEST

| Statement No. | Program Step and Description |
|---|---|
| | within a one second time interval, sets the parameter A1 indicating a powered up engine. The absence of a single interrupt within a one second time interval, clears the parameter A1 indicating a powered down engine. |
| 301 | If A1 Is Not Equal To 0 Go To 302. This instruction is testing the state of the engine as determined by statement 300. If the engine is powered up, the next instruction is executed at 302. If the engine is powered down, the instruction at statement 303 is executed. |
| 302 | DISPLAY "POWER DOWN ENGINE". Go To 300. The first instruction outputs the message "POWER DOWN ENGINE" to the operator. Control is then transferred to statement 300. The engine must be powered down to proceed testing. |
| 303 | DISPLAY "BEGIN CRANK". This instruction outputs the message "BEGIN CRANK" to the operator indicating that the system is ready to perform data acquisition and analysis. |
| 304 | CALL 1, A1. Execution of this instruction performs an identical function to that of statement 300. The engine is being monitored for a "cranking" state. |
| 305 | If A1 = 0 Go To 304. This instruction is testing the state of the engine as determined by statement 304. The engine must be cranking to continue testing. |
| 306 | CALL 2, A2. This computer instruction delays A2 seconds before executing the statement at 307. The delay is necessary to burn off any fuel present in the engine's cylinders. |
| 307 | CALL 3, N1. Execution of this instruction outputs the commands divide by one and count control. This command counts the number of teeth on the ring gear for one engine cycle. The count is saved in parameter N1. |
| 308 | CALL 4, X0, X1. This instruction requests the input of X0 ring gear time intervals via the divide by ten command. Data is acquired and stored into consecutive sixteen bit memory locations. The vector parameter X1 represents these memory locations. Data is stored in biased ten format expressing time between teeth in microseconds. |
| 309 | DISPLAY "END CRANK". This instruction outputs the message "END CRANK" to the operator. Data acquisition is complete. |
| 310 | CALL 5, X0, X1, N2. This instruction invokes a procedure which: performs filtering of any noisy or bad time interval readings from the X0 members of the vector X1. The filtering process is performed by replacing any member X1(I) of the data sample that differs more than + or − 3% from its previous member X1 (I−1) with an estimated value given by: $$X1(I) = 2*X1(I-1) - X1(I-2)$$ sets N2 to the location of the first crank mark occurance in X1 vector. |
| 311 | CALL 6, X0, X1, X2. This instruction invokes a procedure which will perform X2 number of samples moving average smoothing of X1 vector. That is for each X1(I), it is replaced by $$X1(I) = \frac{1}{X2} [X1(I) + X1(I+1) + \ldots + X1(I+X2-1)]$$ |
| 312 | CALL 7, X0, X1, X3, X4, X5, X6. This instruction invokes a procedure that will determine the following: <br> X3 - The array of peak locations in terms of tooth count location within the vector X1. <br> X4 - The array of peak values associated with each corresponding peak location in array X3. <br> X5 - The array of valley locations in terms of tooth count location within the vector X1. <br> X6 - The array of valley values associated with each corresponding valley location in array X5. <br> The procedure for determining the peaks and valleys is based on successive examination of the vector X1. |
| | As the values in X1 are successively increasing, a peak is being searched until the value starts decreasing, then a peak is located and the tooth count location is stored in X3 and the time interval value is stored in X4. The search is then started for the valley as the values in X1 are successively decreasing until the value starts increasing again which indicates a valley is located and the tooth count location is then stored in X5 and the time interval value stored in X6. The process is then reverted back to search for peak again. |
| 313 | CALL 8, X3, X4, X5, X6, X7, N3, N2. This instruction invokes the procedure to determine the compression index for each cylinder. The procedure is as follows: When the distance between peak location in X3 and its associated valley location in X5 for the valley immediately following the peak is within 75% of N3, where N3 is the tooth count of an engine cycle divided by the number of cylinders, the compression index is simply the corresponding peak value in X4 minus the corresponding valley value in X6. The compression index is then stored into Ith member of X7 array for the Ith member. The cylinder identification, I is determined from the apriori knowledge of cylinder firing order, which cylinder fires immediately after the crank mark, the crank mark location N2 and how many multiples of N3 is the distance between the crank mark and the peak location. When there is a missing peak as indicated by the larger (greater than 1.5*N3) difference between two successive peak locations. An estimated peak value for that cylinder is determined by taking the value of X1 vector at the location of N3 plus the location of the previous peak, and the estimated valley value is set to the value of X1 vector at the location of N3/2 from the estimated peak location. The compression index is then computed as before. |
| 314 | CALL 9, X7, X8. This instruction invokes a procedure which will classify the compression indices of vector X7 into groups. A group is formed where all members of the group differ by less than 20% from the mean value of that group. Given these groups, the mean value of the group with the most members is selected to represent the parameter X8. |
| 315 | CALL 10, X7, X8. This instruction invokes a procedure which converts the compression indices into relative compression ratios by dividing each member of X7 by X8 and stores the results back into X7. |
| 316 | LET F1 = 0. This instruction clears a flag which signifies the presence or absence of a fault within the engine under test. The flag is utilized to determine if the no fault message is to be displayed in statement 324. |
| 317 | LET I1 = I. This instruction initializes the cylinder index to the first cylinder. |
| 318 | IF X7 (I1) is equal to or greater than L1 Go To 319 Otherwise Go To 321. This instruction compares the relative compression index for cylinder I1 with a threshold L1. If the relative compression index is greater than or equal to this threshold, no fault exists for this cylinder, and the next statement to be executed is 319. Else, control is transferred to statement 321. |
| 319 | LET I1 = I1+1. This instruction increments the cylinder index by one. |
| 320 | If I1 is equal to or less than L2 Go To 318. Otherwise Go To 323. This instruction determines if there are more cylinders to compare against the threshold for the engine under test. L2 represents the number of cylinders. Control is transferred to statement 323 when cylinder exceed L2. |
| 321 | DISPLAY "LOW COMPRESSION CYLINDER I1". This instruction outputs the message "LOW COMPRESSION CYLINDER: I1 to the operator. |
| 322 | LET F1 = 1. Go To 319. This instructions sets the fault flag. Control is transferred to statement 319. |
| 323 | IF F1 = 0 Go To 325. This instruction interrogates |

APPENDIX A-continued
COMPRESSION TEST

| Statement No. | Program Step and Description |
|---|---|
| | the fault flag F1. If a fault was found, control is transferred to statement 325. Else, control is transferred to statement 324. |
| 324 | DISPLAY "ENGINE PASS COMPRESSION TEST". This instruction outputs the message "ENGINE PASS COMPRESSION TEST" to the operator. The test is complete. |
| 325 | STOP. This instruction signifies the end of the test. |

APPENDIX B
POWER PERFORMANCE TEST

| Statement No. | Program Step and Description |
|---|---|
| 400 | CALL 1, A1. This instruction invokes a procedure which accepts input from the ring gear sensor. The input sequence is initiated by a divide by one output instruction. If the engine is powered up, interrupts are generated for each ring gear tooth as it passes the sensor. The presence of a single interrupt, within one second time interval, sets the parameter A1 indicating a powered up engine. The absence of a single interrupt with a one second time interval, clears the parameter A1 indicating a powered down engine. |
| 401 | IF A1 is not equal to 0 Go To 405. This instruction is testing the state of the engine as determined by statement 400. If the engine is powered up, the next instruction is executed at 405. If the engine is powered down, the instruction at statement 402 is executed. |
| 402 | DISPLAY "START ENGINE, LOW IDLE". This instruction outputs the message "START ENGINE, LOW IDLE" to the operator. |
| 403 | CALL 1, A1. Execution of this instruction performs an identical function to that of statement 400. The engine is being monitored for a power up state. |
| 404 | IF A1 = 0 Go To 403. Otherwise, Go To 406. This instruction is testing the state of the engine as determined by statement 403. The engine must be powered up to continue testing at statement 406. |
| 405 | DISPLAY "LOW IDLE". This instruction outputs the message "LOW IDLE" to the operator. |
| 406 | CALL 2, N1. Execution of this instruction outputs the commands divide by one and count control. This command counts the number of teeth on the ring gear for one engine cycle. The count is expressed by the parameter N1. |
| 407 | CALL 3, N1, A2. This instruction requests the input of N1 ring gear time intervals via the divide by one command, The mean of N1 time intervals is computed and returned in parameter A2. This mean is time in microseconds biased by ten. |
| 408 | IF A2 is equal to or less than M1 Go To 407. This instruction compares the interval time A2 against a pre-selected trigger interval time M1. To proceed testing, the interval time A2 must be greater than the trigger time M1. |
| 409 | DISPLAY "BEGIN SNAP". This instruction outputs the message "BEGIN SNAP" to the operator. In response to this message, the operator rapidly advances the throttle to maximum fuel position. |
| 410 | CALL 4, X0, X1, T1. This instruction invokes a procedure which will output the divide by one command, acquire X0 ring gear interval times when a preselected trigger speed T1 is attained. Ring gear interval time data is acquired and stored into consecutive sixteen bit memory locations. The vector parameter X1 represents these memory locations. Data is stored in biased ten format expressing time between teeth in microseconds. |
| 411 | DISPLAY "END SNAP". This instruction outputs the message "END SNAP" to the operator. In response, |

APPENDIX B-continued
POWER PERFORMANCE TEST

| Statement No. | Program Step and Description |
|---|---|
| | the operator resets the throttle to a minimum fuel position. |
| 412 | CALL 5, X0, N1, N2, N3. This instruction invokes a procedure which: Performs filtering of any noisy time interval reading from the X0 members of the vector X1. The filtering process is performed by replacing any member X1(I) of the data sample that differs more than + or −10% from its previous member X1(I−1) with an estimated value given by $X1(I) = 2*X1(I-1) - X1(I-2)$ Sets N2 to the number of crank marks encountered within the X0 ring gear interval times. Sets N3 to the location of the first crank mark, in terms of tooth location. |
| 413 | IF N2 is less than M2 Go To 409. This instruction compares the number of crank markers encountered within the data sample of X0 points with a threshold M2. M2 represents a required number of crank markers within the data sample of X0 points. If the crank markers encountered N2, are less than this value M2, another sample is requested. |
| 414 | CALL 6, X0, X1, X2, X3, X4, X5, X6, N3, M3. This instruction invokes a procedure which: Computes the start points and the associated end points for acceleration analysis of each cylinder. The start points and end points are defined in terms of tooth count locations within the vector X1. The first start point is computed by the summation of the first crank marker location N3, the tooth count distance between the first crank mark location and the top dead center location of the first cylinder immediately after the crank mark X6, and a selected offset factor from the top dead center X3. The cylinder associated with this first start point is determined by the apriori knowledge as to which cylinder fires immediately after the crank mark from the installation of the crank marker. Each subsequent cylinder's start point, in the order of cylinder firing order is simply N1/M3 teeth count away from the first or the preceding cylinder where N1 is the tooth count of one engine cycle and M3 is the number of cylinders for the engine. The associated end point for each start point is simply a preselected factor X4 tooth count away. Beginning at each start point location, the following X5 number of time interval measurements in the vector X1 are averaged and stored in array X2 at row one and column 1 for the Ith cylinder. Beginning at each end point location, the following X5 number of time interval measurements in the vector X1 are averaged and stored in array X2 at row two and column 1 for the Ith cylinder. |
| 415 | CALL 7, X2, X7. This instruction invokes a procedure which determines the power index array X7. This array is generated by subtracting the end point values of the array X2. That is, the operation X2 (1, I) − X2 (2, I) is performed for all cylinders. This power index value is stored onto array X7 at row two column 1. The start point value X2 (1, i) is stored into array X7 at row one, column 1. $X7(2, I) = X2(1, I) - X2(2, I)$ $X7(1, I) = X2(1, I)$ |
| 416 | LET I1 = 1. This instruction initializes a pointer to one. This pointer is used to access the power index from X7 for usage in statement |

APPENDIX B-continued
POWER PERFORMANCE TEST

| Statement No. | Program Step and Description |
|---|---|
| | 417. |
| 417 | LET X8 (I1) = X7 (2, I1) − G1*X7 (1, I1) + H1. This instruction performs correction of the power index for engine speed. The values G1 and H1 are preselected values for the engine type under test. The vector X8 represents the corrected power index. |
| 418 | LET I1 = I1 + 1. This instruction increments the pointer by one. |
| 419 | IF I1 is equal to or less than M3 Go To 417. This instruction compares the number of cylinders, for which a corrected power index is defined to that of the total number of cylinders M3 for the engine under test. If there are more cylinders requiring a corrected power index, control is transferred back to statement 417. |
| 420 | CALL 8, X8, X9. This instruction invokes a procedure which will classify the power indices of vector X8 into cylinder groups. A group is formed where all members of the group differ by less than 20% from the mean value of that group. Given these groups, the mean of the group with the most members is selected to represent the parameter X9. |
| 421 | LET I1 = 1. This instruction initializes a pointer. This pointer is used to access the corrected power index from X8 for usage in statement 423. |
| 422 | LET F1 = 0. This instruction clears a flag which signifies the presence or absence of a fault within the engine under test. The flag is utilized to determine if the no fault message of statement 430 is to be displayed. |
| 423 | LET X8 (I1) = X8 (I1)/X9. This instruction computes the ratio of each cylinder's corrected power index to the value of the mean index of the reference group. |
| 424 | IF X8 (I1) is equal to or greater than M4 Go To 427. This instruction compares the relative power of each cylinder defined by X8 (I1) to a pre-selected threshold M4. If the relative power of a cylinder is greater than or equal to this threshold, no fault exists for the given cylinder. If the preceding criteria is met, program control resumes at statement 427. |
| 425 | DISPLAY "LOW PERFORMANCE, CYLINDER I1". This instruction outputs the message "LOW PERFORMANCE, CYLINDER I1" to the operator. |
| 426 | LET F1 = 1. This instruction sets the fault flag indicating that an in-cylinder fault was encountered. |
| 427 | LET I1 = I1 + 1. This instruction increments the cylinder index by one. |
| 428 | If I1 is equal to or less than M3 Go to 423. This instruction determines if there are more cylinders to compare against the threshold for the engine under test. M3 represents the number of cylinders for the engine under test. Control is transferred to statement 423 if more cylinders remain to be tested. |
| 429 | IF F1 is not equal to 0 Go To 431. This instruction interrogates the fault flag F1. If a fault was found, control is transferred to statement 431, else, control is transferred to statement 430. |
| 430 | DISPLAY "ENGINE PASS PERFORMANCE TEST". This instruction outputs the message "ENGINE PASS PERFORMANCE TEST" to the operator. The test is complete. |
| 431 | STOP. This instruction signifies the end of test. |

What is claimed is:

1. Apparatus for determining malfunctions of individual cylinders of an internal combustion engine, comprising:

means for measuring the values of the time intervals between successive crankshaft positions as the crankshaft of a said engine rotates through at least one engine cycle, wherein one engine cycle includes a number of power periods corresponding with the number of cylinders of the engine being tested and wherein each power period includes a plurality of said crankshaft positions;

first means for comparing for each power period the values of selected said time intervals associated with selected said crankshaft positions in the associated power period and providing for each cylinder a first indication having a value in accordance therewith; and, second means for comparing each said first indication with said other first indications and providing for each cylinder a second indication having a value in accordance with the ratio of the value of said first indication for that cylinder to the average value of at least two of said first indications.

2. Apparatus as set forth in claim 1 including third means for comparing each said second indication with a reference level and providing an output indication in accordance therewith.

3. Apparatus as set forth in claim 2 including programmed computer means for computing said first, second, and output indications.

4. Apparatus as set forth in claim 3, wherein said computer means is programmed to compute the values of each said first indication by determining the difference in values of a selected pair of time intervals for each power period.

5. Apparatus as set forth in claim 4, wherein said computer means is programmed to compute a said output indication by determining whether any one of said ratios has a value which is less than a reference ratio.

6. Apparatus for performing a compression test to determine compression faults of individual cylinders of an internal combustion engine while the engine's crankshaft is being driven by a crank motor, comprising:

means for measuring the values of the time intervals between successive crankshaft positions as the crankshaft is being driven through at least one engine cycle, wherein one engine cycle includes a plurality of power periods corresponding in number with the number of cylinders of the engine being tested and wherein each power period includes a plurality of said crankshaft positions;

means for comparing for each power period the values of a pair of said time intervals associated with a selected pair of said crankshaft positions in the associated power period and providing for each cylinder a compression indication having a value in accordance therewith; and, means for comparing each said compression indication with said other compression indications and providing for each cylinder a compression ratio indication having a value in accordance with the ratio of the value of the cylinder's compression indication to the average value of at least two of said compression indications.

7. Apparatus as set forth in claim 6, including means for comparing each said compression ratio indication with a reference ratio and providing a compression level output indication in accordance therewith.

8. Apparatus as set forth in claim 7, including programmed computer means for computing said compression indications, said compression ratio indications, and said compression level output indications.

9. Apparatus as set forth in claim 8, wherein said computer means is programmed to compute the values of each said compression indication by determining the difference in the values of said time intervals of each said pair of time intervals for each said power period.

10. Apparatus as set forth in claim 9, wherein said computer means is programmed to compute the values of each said compression ratio indication by determining the ratio of the value of each said compression indication to the average value of at least two of said compression indications.

11. Apparatus as set forth in claim 10, wherein said computer means is programmed to compute a said compression level output indication by determining whether any one of said compression ratio indications has a value which is less than a reference ratio.

12. Apparatus for performing a power performance test to determine power faults of individual cylinders of an internal combustion engine while the engine is operating and the crankshaft is being rapidly accelerated from a low engine speed to a high engine speed, comprising:
  means for measuring the values of the time intervals between successive crankshaft positions as the crankshaft is being accelerated through at least one engine cycle, where one engine cycle includes a plurality of power periods corresponding in number with the number of cylinders of the engine being tested and wherein each power period includes a compression stroke and an acceleration stroke with each stroke having a plurality of said crankshaft positions;
  means for comparing for each power period the values of a selected pair of said time intervals associated with a selected pair of said crankshaft positions in the acceleration stroke of an associated power period and providing for each cylinder a power performance indication having a value in accordance therewith; and,
  means for comparing each said power performance indication with said other power performance indications and providing for each cylinder a power performance ratio indication having a value in accordance with the ratio of the value of the cylinder's power performance indication to the average value of at least two said power performance indications.

13. Apparatus as set forth in claim 12, including means for comparing each said power performance ratio indication with a reference ratio and providing a power performance output indication in accordance therewith.

14. Apparatus as set forth in claim 13, including programmed computer means for computing said power performance indications, said power performance ratio indications, and said power performance output indications.

15. Apparatus as set forth in claim 14, wherein said computer means is programmed to compute the values of each said power performance indication by determining the difference in the values of said time intervals of each said pair of time intervals for each said power period.

16. Apparatus as set forth in claim 15, wherein said computer means is programmed to compute the values of each said power performance ratio indication by determining the ratio of the value of each said power performance indication to the average value of at least two of said power performance indications.

17. Apparatus as set forth in claim 16, wherein said computer means is programmed to compute a said power performance output indication by determining whether any one of said power performance ratio indications has a value which is less than a reference ratio.

18. A method of performing compression tests to determine compression faults of individual cylinders of an internal combustion engine while the engine's crank shaft is being driven by a crank motor comprising:
  energizing said crank motor to drive said engine at a relatively constant speed;
  measuring the values of the time intervals between successive crank shaft positions as the crank shaft is being driven through at least one engine cycle, wherein one engine cycle includes a plurality of power periods corresponding in number with the number of cylinders of the engine being tested and wherein each power period includes a plurality of said crank shaft positions;
  comparing for each power period the values of a pair of said time intervals associated with a selected pair of said crank shaft positions in the associated period and providing for each cylinder a compression indication having a value in accordance therewith; and,
  comparing each said compression indication with said other compression indications and providing for each cylinder a compression ratio indication having a value in accordance with the ratio of the value of the cylinder's compression indication to the average value of at least two of the compression indications.

19. A method of performing a power performance test to determine power faults of individual cylinders of an internal combustion engine while the engine is operating and comprising the steps of:
  rapidly accelerating the engine's crank shaft from a low engine speed to a high engine speed;
  measuring the values of the time intervals of the time between successive crank shaft positions as the crank shaft is being driven through at least one engine cycle, wherein one engine cycle includes a plurality of power periods corresponding in number with the number of cylinders of the engine being tested and wherein each power period includes a plurality of said crank shaft positions;
  comparing for each power period the values of a selected pair of the time intervals associated with a selected pair of the crank shaft positions in the acceleration stroke of an associated power period and providing for each cylinder a power performance indication having a value in accordance therewith; and,
  comparing each power performance indication with the other power performance indications and providing for each cylinder a power performance ratio indication having a value in accordance with the ratio of the value of the cylinder's power performance indications.

* * * * *